(12) United States Patent
Gonzaga et al.

(10) Patent No.: US 9,126,463 B2
(45) Date of Patent: Sep. 8, 2015

(54) BEAD BREAKER GROUP FOR A TIRE MOUNTING-DEMOUNTING MACHINE

(75) Inventors: Tullio Gonzaga, Correggio (IT); Silvano Santi, Imola (IT)

(73) Assignee: BUTLER ENGINEERING & MARKETING S.P.A., Reggio Emilia (IT)

( * ) Notice: Subject to any disclaimer, the term of this patent is extended or adjusted under 35 U.S.C. 154(b) by 302 days.

(21) Appl. No.: 12/780,997

(22) Filed: May 17, 2010

(65) Prior Publication Data

US 2010/0294436 A1    Nov. 25, 2010

(30) Foreign Application Priority Data

May 19, 2009  (IT) ............................... VR2009A0069

(51) Int. Cl.
| | | |
|---|---|---|
| *B60C 25/13* | (2006.01) | |
| *B60C 25/132* | (2006.01) | |
| *B60C 25/138* | (2006.01) | |
| *B60C 25/02* | (2006.01) | |
| B60C 25/04 | (2006.01) | |

(52) U.S. Cl.
CPC ................. *B60C 25/13* (2013.01); *B60C 25/02* (2013.01); *B60C 25/132* (2013.01); *B60C 25/138* (2013.01); *B60C 25/025* (2013.01); *B60C 25/04* (2013.01)

(58) Field of Classification Search
CPC .... B60C 25/132; B60C 25/138; B60C 25/04; B60C 25/02; B60C 25/025
USPC ............... 157/1.24, 1.2, 1.26, 1.28; 280/81.6; 355/100
See application file for complete search history.

(56) References Cited

U.S. PATENT DOCUMENTS

| | | | | |
|---|---|---|---|---|
| 2,577,684 | A * | 12/1951 | Horne ......................... | 157/1.24 |
| 3,740,139 | A * | 6/1973 | Limberger .................... | 355/100 |
| 4,047,553 | A * | 9/1977 | Kotila .......................... | 157/1.24 |
| 6,109,327 | A * | 8/2000 | Gonzaga ...................... | 157/1.28 |
| 6,880,606 | B2 * | 4/2005 | Gonzaga ...................... | 157/1.28 |
| 6,935,397 | B2 * | 8/2005 | Gonzaga ...................... | 157/1.28 |
| 8,051,889 | B2 * | 11/2011 | Ferrari et al. ................ | 157/1.28 |
| 2001/0042601 | A1 * | 11/2001 | Corghi ......................... | 157/1.26 |
| 2009/0101287 | A1 * | 4/2009 | Gonzaga et al. ............. | 157/1.17 |

FOREIGN PATENT DOCUMENTS

| | | |
|---|---|---|
| EP | 0 838 354 | 4/1998 |
| EP | 0 947 360 | 10/1999 |
| EP | 0 987 130 | 3/2000 |
| EP | 1 916 125 | 4/2008 |

* cited by examiner

*Primary Examiner* — Monica Carter
*Assistant Examiner* — Danny Hong
(74) *Attorney, Agent, or Firm* — Tutunjian & Bitetto, P.C.

(57) ABSTRACT

The present disclosure relates to a bead breaker group for a tire mounting-demounting machine, which includes a support arm displaceable, in use, in two bead breaking directions along one bead breaking axis, and includes a pair of bead breaker tools supported on substantially opposite sides with respect to the support arm, thereby defining opposite work fronts directed away from the support arm, the work front of a first bead breaker tool of the pair of bead breaker tools being directed towards one bead breaking direction of the two bead breaking directions, whereas the work front of a second bead breaker tool of the pair of bead breaker tools is directed towards the other bead breaking direction of the two bead breaking directions.

18 Claims, 6 Drawing Sheets

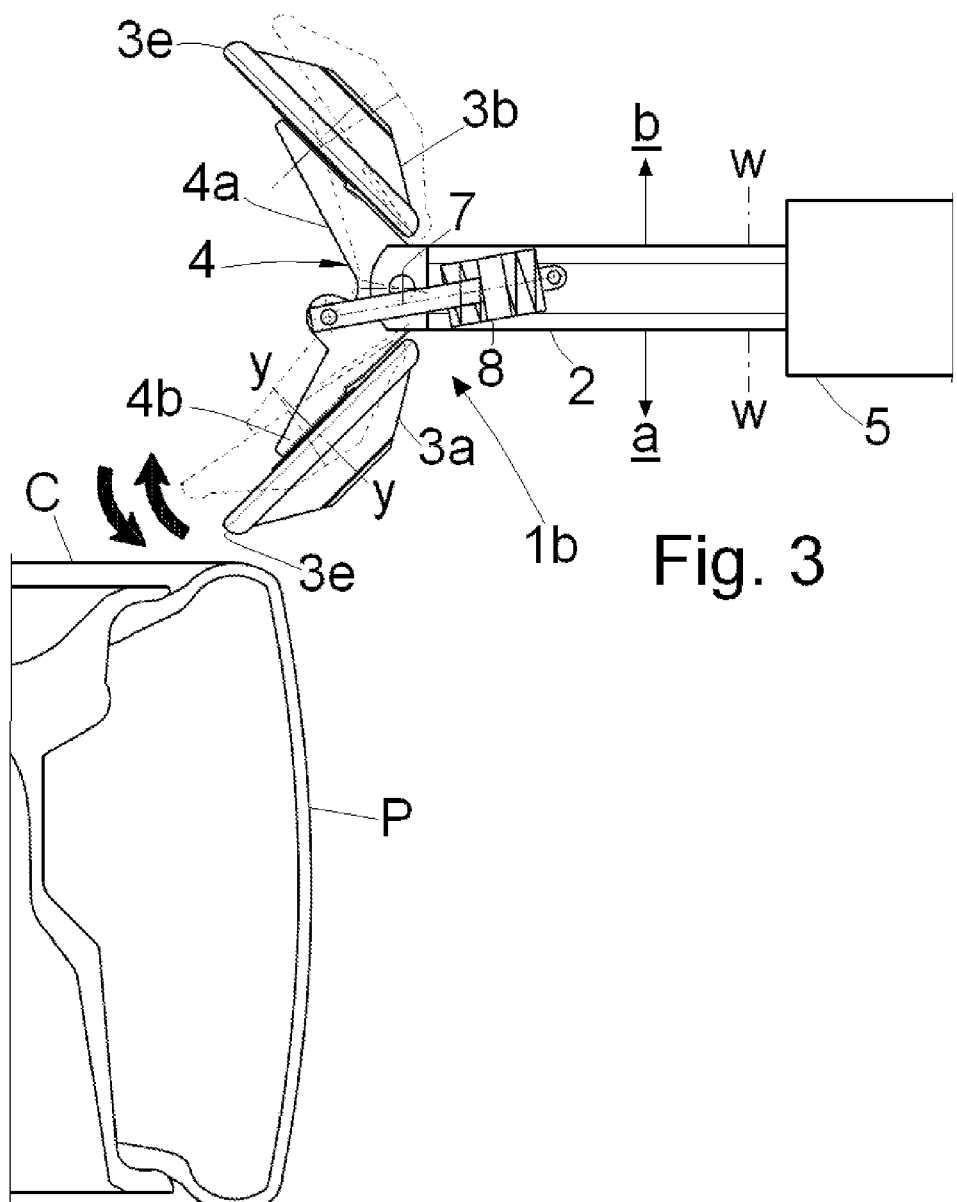
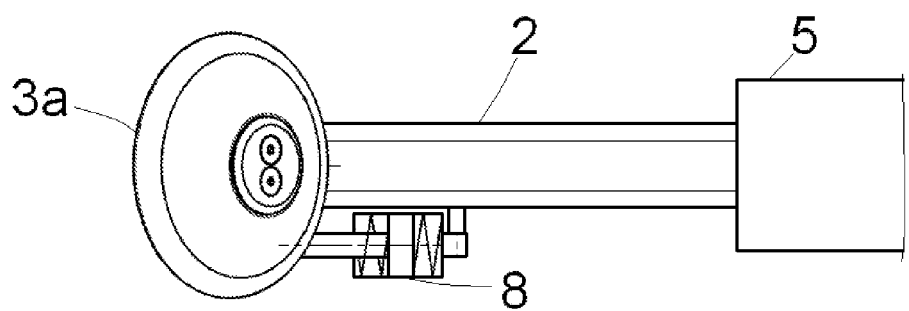

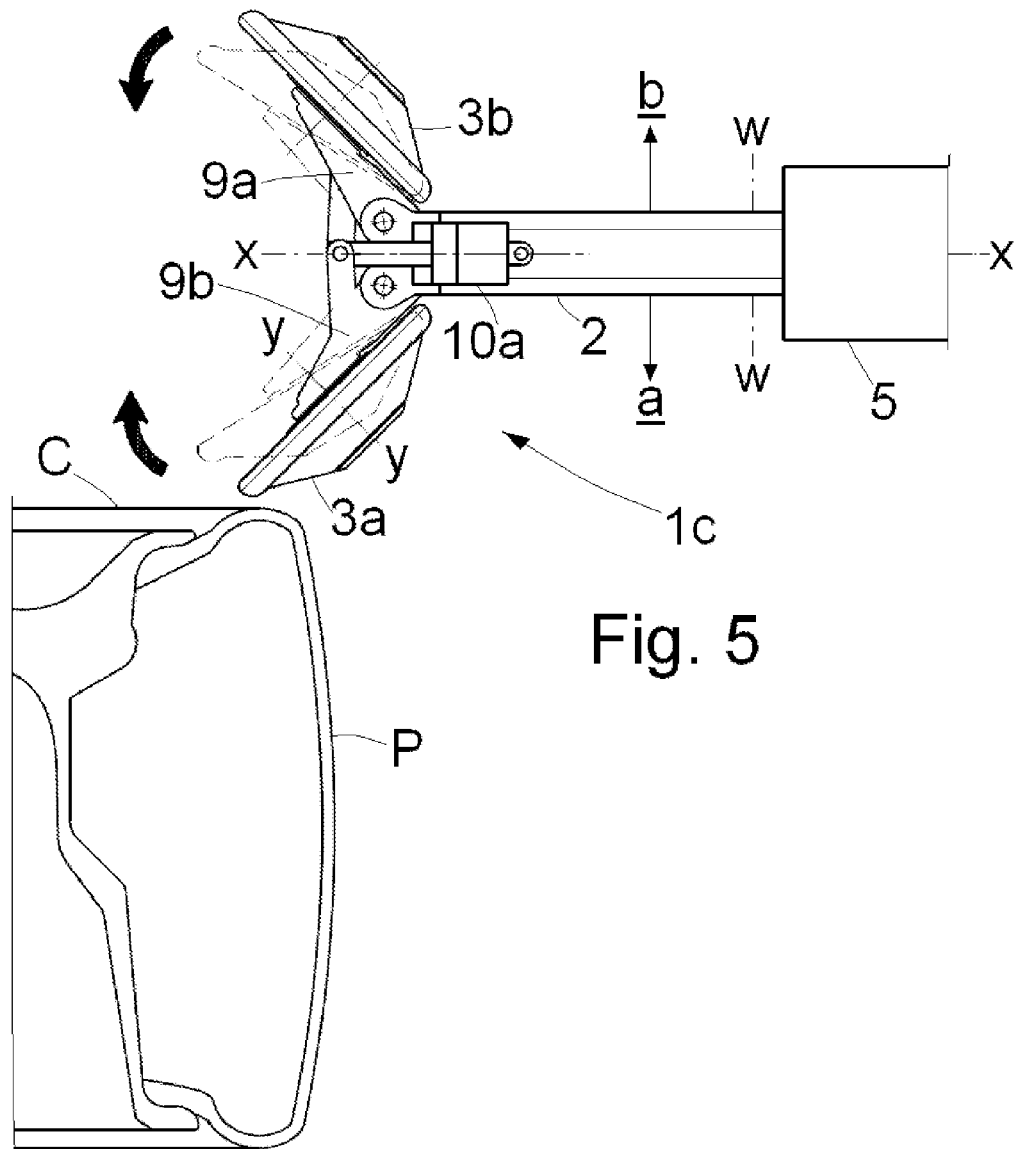
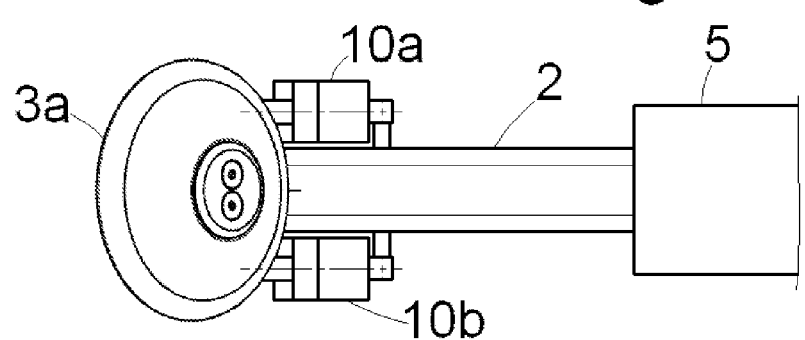

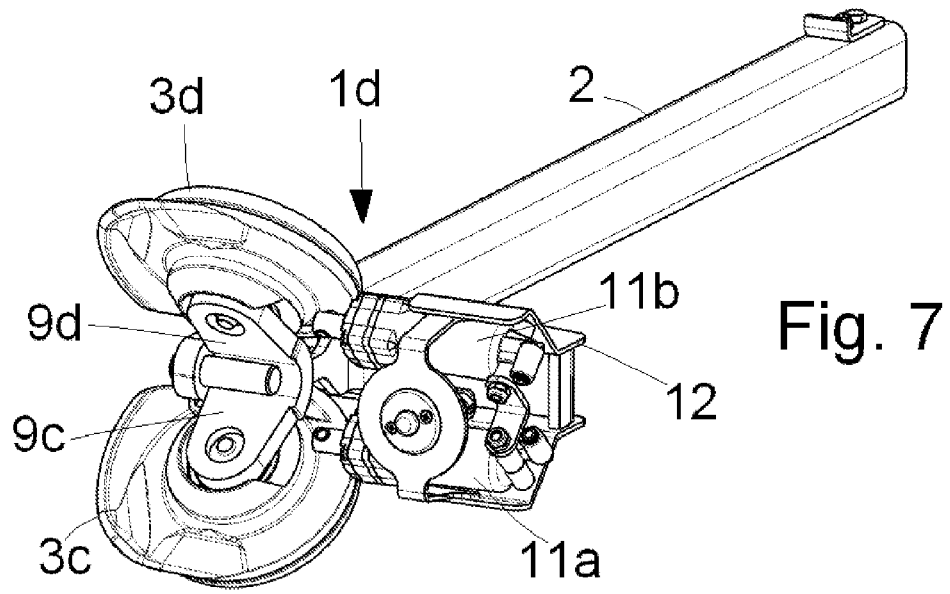
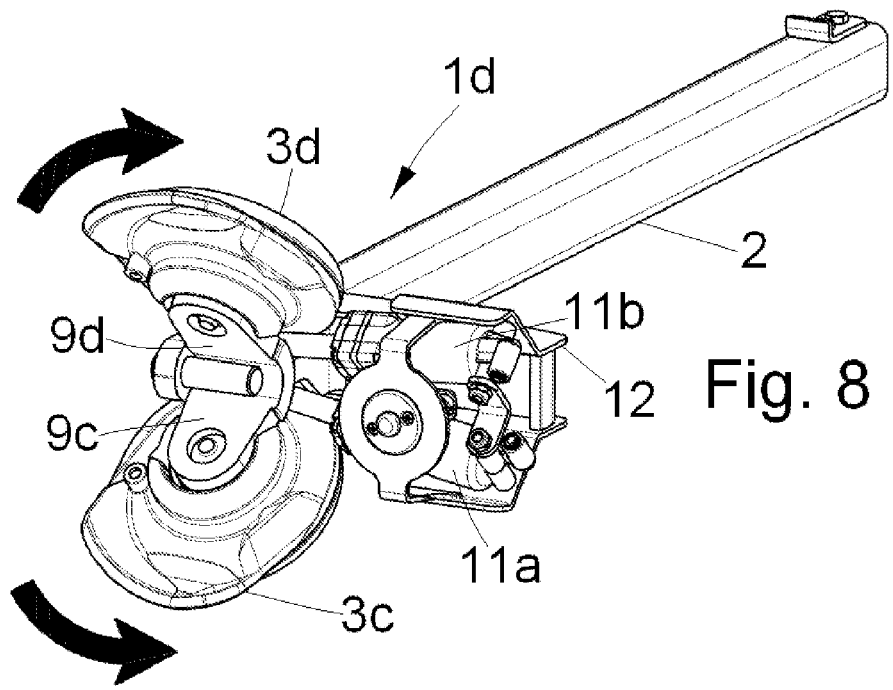

BEAD BREAKER GROUP FOR A TIRE MOUNTING-DEMOUNTING MACHINE

FIELD OF INVENTION

The present invention regards a bead breaker group for a tire mounting-demounting machine, as well as a bead breaking process.

BACKGROUND OF INVENTION

Conventional bead breaking machines, as is known, generally comprise a base, a wheel-carrier table mounted for rotation on the base, a column rising from the base and one or more arms for supporting tools, which can be mounting-demounting tools and/or one or more bead breaker rollers.

A bead breaker roller or tool is used for "bead breaking" or separating a tire from the edge of its respective rim, before proceeding with the actual disassembly of the tire, i.e. before forcing the tire to go beyond an edge of the rim for its extraction from the rim.

Tire mounting-demounting machines have already been proposed equipped with two bead breaker arms extending overhangingly from the column. Each arm supports a bead breaker roller, the bead breaker rollers being mounted for rotation at the head of respective arms so as to have opposing work fronts, i.e. directed against each other. In practice, once a tired wheel to be disassembled was placed and locked on the wheel-carrier table of a tire mounting-demounting machine, the extension/retraction and/or lowering/raising of the bead breaker arms is controlled so as to bring one bead breaker roller to one flank of the wheel and the other bead breaker roller to the other flank of the wheel. The wheel-carrier table is then rotated and a brief mutual approaching movement of the arms is simultaneously commanded; each bead breaker tool will then cause the progressive separation of the respective bead from the edge of the rim until the bead breaking at both flanks has been completed.

Tire mounting-demounting machines have already been proposed equipped with a single bead breaker arm, which after having bead broken one flank of a tire is moved to the opposite side of the wheel, i.e. to the other tire flank, in order to carry out the bead breaking also of the second flank of the tire.

As will be understood, conventional tire mounting-demounting machines are structurally complex and hence costly, and those with only one bead breaker arm involve rather long bead breaker times.

Patent documents, such as EP-0 838 354, EP-1 916 125, U.S. Pat. No. 4,047,553, EP-0 987 130, and EP-0 947 360 relate to mounting-dismounting machines including an arm supporting a pair of bead releasing rollers, which are designed to co-act or simultaneously engage, in use, a portion of a bead of a tired wheel to be bead released.

SUMMARY OF THE INVENTION

The main object of the present invention is that of providing a bead breaker group which is structurally very simple and thus obtainable at low cost, but which at the same time allows carrying out bead breaking operations in a rapid and efficient manner.

Another object of the present invention is that of supplying a new tire mounting-demounting machine equipped with a new bead breaker group which allows lowering the production costs of a tire mounting-demounting machine.

According to a first aspect of the present invention, a bead breaker group for a tire mounting-demounting machine is provided, which includes a support arm displaceable, in use, in two bead breaking directions along one bead breaking axis, and comprises a pair of bead breaker tools supported on substantially opposite sides with respect to the support arm, thereby defining opposite work fronts directed away from the support arm, the work front of a first bead breaker tool of the pair of bead breaker tools being directed towards one bead breaking direction of the two bead breaking directions, whereas the work front of a second bead breaker tool of the pair of bead breaker tools is directed towards the other bead breaking direction of the two bead breaking directions.

According to another aspect of the present invention, a tire mounting-demounting machine is provided, which includes a base, a wheel-carrier support rotatable around a rotation axis, on which a rim or a tired wheel is removably fixable, and at least one column rising from the base, a bead breaker group according to the present invention, the support arm being projectingly supported by the column so as to be transversely extended with respect to the rotation axis of the wheel-carrier support.

According to a third aspect of the present invention a bead breaking method is provided, which is carried out by means of a tire mounting-demounting machine according to the present invention, comprising the following steps:

prearranging, on the wheel-carrier support, a tired wheel to be bead broken comprising a rim and a tire mounted thereon;

bringing the bead breaker group with a first bead breaker tool having a work front close to a zone of contact between a first bead of the tire and a respective edge of the rim, and directed towards the first bead, whereas the second bead breaker tool has the work front thereof directed away from the first bead;

displacing the bead breaker group in a first bead breaking direction along the axis, thereby bead breaking the first bead via the first bead breaker tool;

moving the bead breaker group so as to bring it to the second bead of the tired wheel, with the other bead breaker tool thereof having work front close to a zone of contact between the second bead and the respective edge of the rim, and directed towards the second bead, whereas the first bead breaker tool has work front directed away from the second bead; and displacing the bead breaker group along a second bead breaking direction, thereby bead breaking the second bead by means of the second bead breaker tool.

BRIEF DESCRIPTION OF THE DRAWINGS

Further aspects and advantages of the present invention will better appear from the following detailed description of specific embodiments of a bead breaking group, with reference to the accompanying drawings, in which:

FIG. 3 is a view similar to FIG. 2 illustrating another embodiment of a bead breaker group according to the present invention;

FIG. 4 is a bottom view of the bead breaker group of FIG. 3;

FIGS. 5 and 6 are similar views to FIGS. 3 and 4 of another bead breaker group embodiment according to the present invention;

FIGS. 7 and 8 are perspective views, slightly from above, of another bead breaker group embodiment according to the present invention in respective operative positions;

In the drawings, equivalent or similar parts or components are marked with the same reference numerals.

DETAILED DESCRIPTION OF THE PREFERRED EMBODIMENTS

Figure 1:
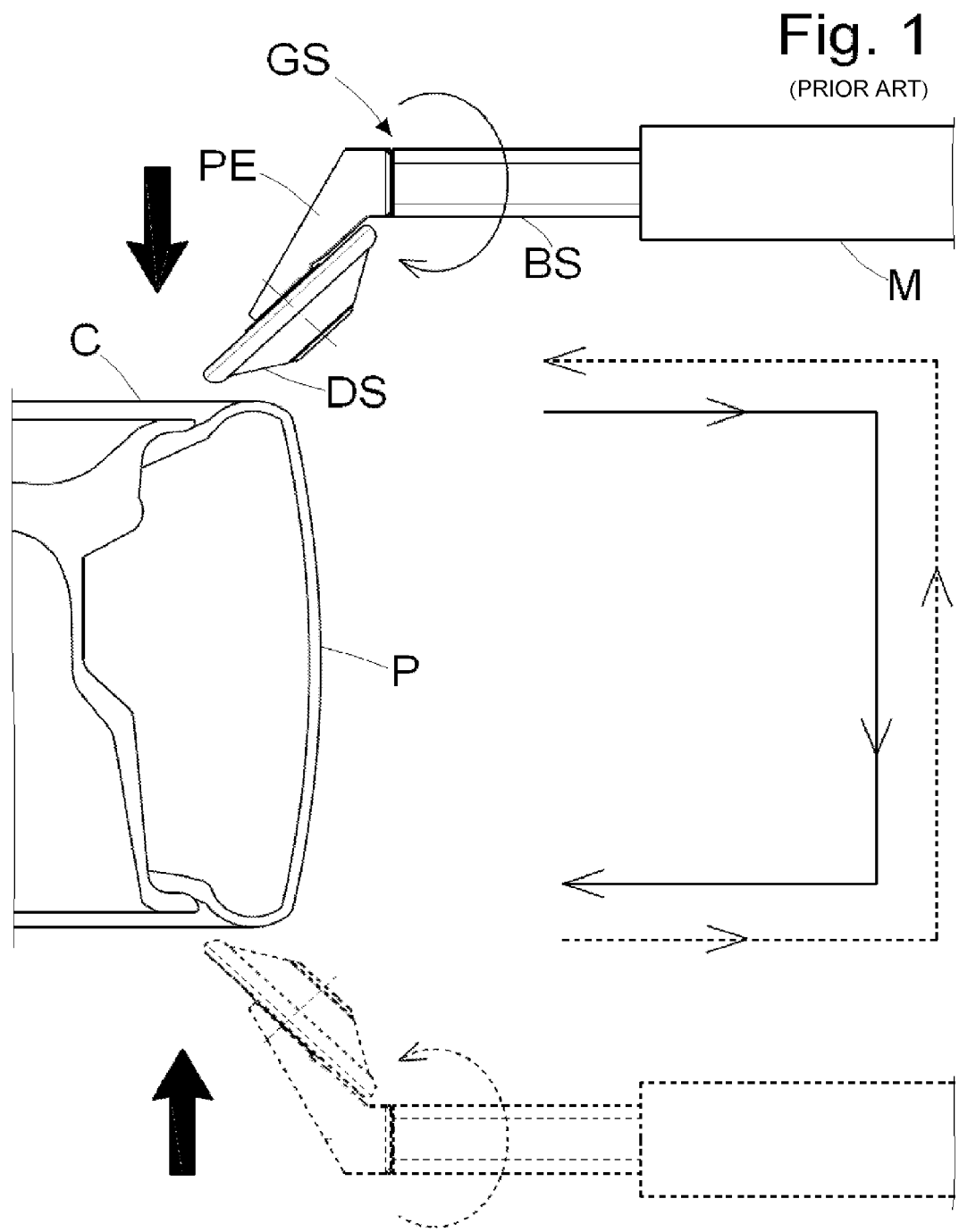
FIG. 1 is a schematic side view which illustrates steps of bead breaking by means of a bead breaker group for a conventional tire mounting-demounting machine.

FIG. 1 illustrates a bead breaker group GS for a conventional tire mounting-demounting machine, which includes a support arm BS for a bead breaker roller DS with frustoconical configuration. More particularly, the arm BS includes a curved end PE to which the bead breaker roller DC, preferably idle, is articulated.

The support arm BS is for example insertable in/extractable from a sleeve or bush M which is mounted for rotation on the column of a tire mounting-demounting machine, so that it can be rotated around an axis coinciding with or parallel to the longitudinal axis of the arm BS.

As stated above, in order to achieve the bead breaking of both the beads of a tire P from the respective rim C with one such machine, one must first bead break a first bead via the roller DS, then the latter must be brought to the opposite side of the wheel, and then one must command the approximately 180° rotation of the arm around an axis coinciding with or parallel to its longitudinal axis. Finally, the bead breaking of the second bead must be undertaken.

Figure 2:
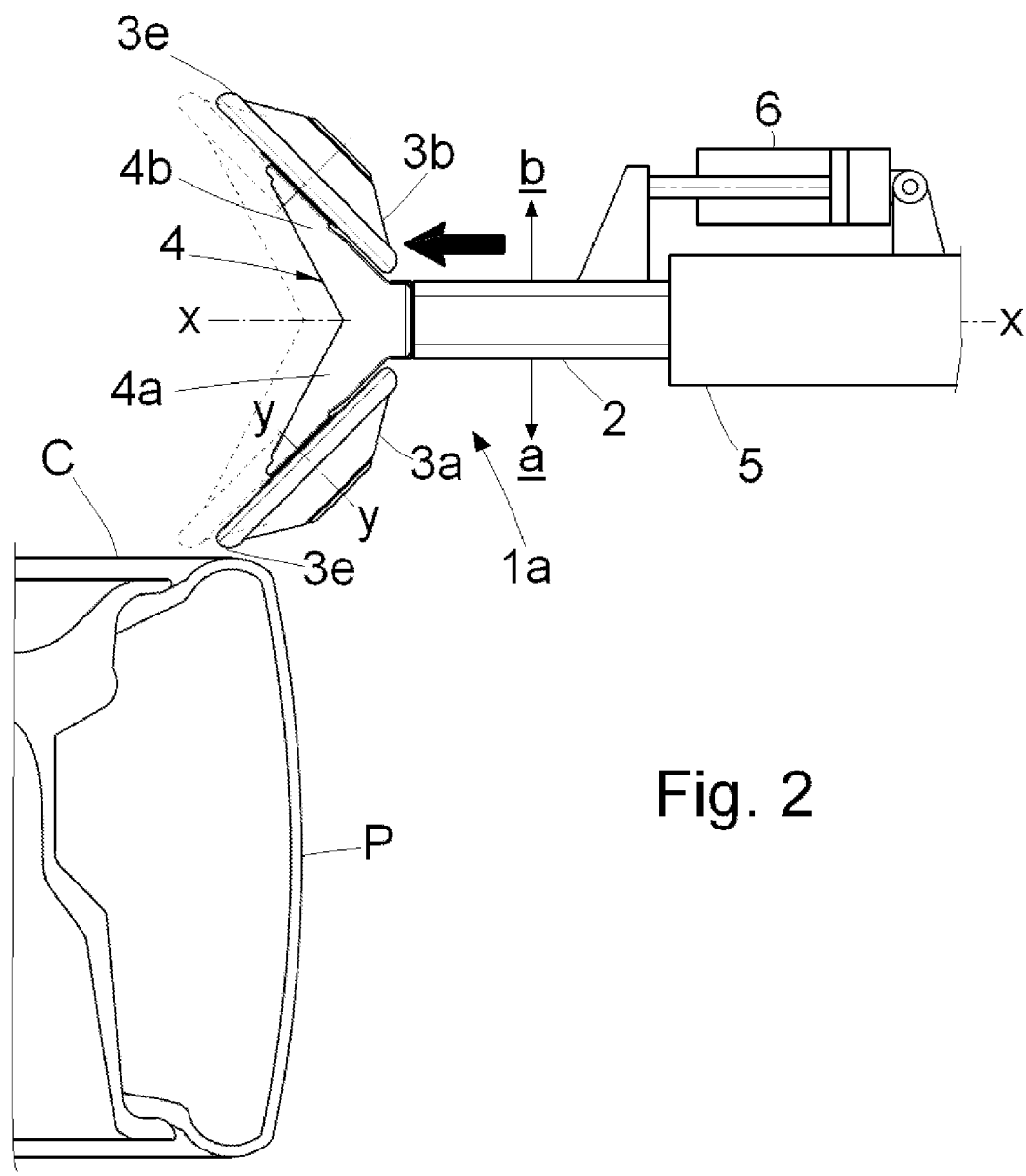
FIG. 2 is a schematic side view of a bead breaker group according to the present invention very close to a wheel to be bead broken, with bead breaker tools illustrated in two work positions.

With reference to FIG. 2, a bead breaker group 1a is instead illustrated according to the present invention, which comprises a support arm 2 with longitudinal axis x-x, and a pair of bead breaker tools 3a, 3b which are supported by the support arm 2. The two tools 3a, 3b are substantially supported on opposite sides of the arm 2, in a manner so as to define opposite work fronts 3e directed away from the support arm.

More particularly, the support arm 2 is displaceable, in use, in two bead breaking directions a and b along one bead breaking axis w-w, and the work front of a first bead breaker tool 3a is directed towards one bead breaking direction a, whereas the work front of a second bead breaker tool 3b is directed towards the other bead breaking direction b.

Due to one such bead breaker group, it is possible to carry out a bead breaking of both beads of a tire P from the respective rim C by bringing the arm 2 first to one side and then to the opposite side of the tired wheel (mounted on the wheel-carrier table), without it being necessary to command the rotation around the longitudinal axis x-x of the arm and thus without it being necessary to provide for actuator means for such purpose.

When the arm 2 is arranged at one flank of the tired wheel mounted on the table, the bead breaking of the respective bead will be carried out by means of one of the tools 3a, whereas when the arm 2 is brought to the other side, it will be the other tool 3b to achieve the bead breaking.

More particularly, the bead breaker group 1a is brought with a first bead breaker tool 3a having a work front 3e close to a zone of contact between a first bead of the tire and a respective edge of the rim, and directed towards the first bead, i. e. facing the first flank of the tire, whereas the second bead breaker tool 3b has the work front thereof directed away from the first bead (see FIG. 2). Subsequently, the bead breaker group is displaced in a first bead breaking direction a along the axis w-w, thereby bead breaking the first bead via the first bead breaker tool 3a. The bead breaker group is subsequently brought to the second bead of the tired wheel, with the other bead breaker tool 3b thereof having work front 3e close to a zone of contact between the second bead and the respective edge of the rim, and directed towards the second bead, i. e. facing the second flank of the tire, whereas the first bead breaker tool 3a has work front directed away from the second bead. Finally, the bead breaker group is displaced along a second bead breaking direction b, thereby bead breaking the second bead by means of the second bead breaker tool 3b.

As will be understood, this is possible since two bead breaker tools or rollers 3a, 3b are provided for, anchored to one same arm 2, the two rollers having work fronts 3e, i. e. the portion which, in use, comes into contact with the tire, opposing each other, directed away from the support arm and each directed towards a respective bead breaking direction a, b.

Preferably, the bead breaker group 1a includes a pair of appendages or brackets 4a, 4b extending from the arm 2, on opposite sides from each other with respect to the arm or to the longitudinal axis x-x of the arm. Each of the appendages 4a, 4b supports a respective bead breaker tool 3a, 3b.

The pair of appendages 4a, 4b can for example make up a single-body component 4 anchorable to the support arm 2.

Preferably, one or both of the bead breaker tools 3a, 3b are directed with their work front aimed backward, i. e. each of these is externally anchored to the respective appendage, with respect to the area delimited by the two appendages 4a, 4b.

Preferably, the bead breaker tools are so-called bead breaker rollers 3a, 3b with frustoconical configuration, for example, and mounted idly for rotation on the respective appendage or bracket 4a, 4b around a transverse rotation axis y-y, preferably not orthogonal with respect to the longitudinal axis x-x of the arm 2. During the bead-breaking operations, when a roller 3a, 3b is in contact with a portion of a bead, this will be driven in rotation with respect to its respective appendage due to friction contact with the tire. As can be understood, the bead breaker rollers or tools could also be motorized.

The arm 2 can be telescopic, or insertable in/extractible from a sleeve or bush 5, e.g. projectingly supported by the column of a tire mounting-demounting machine.

In such case, the machine can also include an actuator 6, on one side fixed to the sleeve or bush 5 and on the other side articulated to the arm 2, it being designed to command the extension/withdrawal of the arm 2 with respect to the sleeve or bush 5.

Advantageously, both the bead breaker tools have a transverse rotation axis y-y extending in the plane delimited by the longitudinal axis x-x and the bead breaking axis w-w or in a plane substantially parallel thereto.

In FIGS. 3 and 4, a bead breaker group 1b is instead illustrated that is similar to that just illustrated, but in which the single-body component 4 is pivoted to the arm 2 at 7 around a transverse axis of the arm (preferably orthogonal to the axis x-x), and also includes an actuator means 8, on one side anchored to the arm 2 and on the other side anchored to the single-body component 4. Such means 8 is meant to command the angular travels of the single-body component with respect to the arm 2.

The actuator 8 can be a simple or double-acting actuator, pneumatic or hydraulic, e. g. spring-loaded.

With a bead breaker group according to such embodiment, the bead breaker group is brought to a first flank of the tired wheel, and the actuator 8 is controlled so as to command the articulation of the single-body component 4 in a manner so as to move the tool 3a, now situated near the wheel itself, close to the rotation axis of the wheel-carrier table. At this point, the bead breaker group is moved in a first bead breaking direction a, which is substantially parallel to the rotation axis z-z of the wheel-carrier table, so as to bring it in abutment against the tire, and then the bead breaking of the first bead of tire is carried out by the first bead breaking tool 3a. The bead breaker group is then moved away from the wheel, preferably first in a direction b parallel to the rotation axis z-z of the wheel-carrier table and then in a radial direction with respect to the same. At this point, the bead breaker group is moved to the other side of the tire and (by means of the actuator 8), the articulation of the single-body component 4 is commanded so as to move the other tool 3b (now situated near the wheel) close to the rotation axis z-z of the wheel-carried table. The bead breaking operations are then carried out of the second tire bead displacing the bead breaker group along a second bead breaking direction b, thereby bead breaking the second bead by means of the second bead breaker tool 3b.

With one such bead breaker group 1b, when a bead breaker tool 3a or 3b is driven and completes the bead breaking of a bead of the tire, the other tool 3b is moved away from the work area and thus there is reduced risk that one of the bead breaker tools 3b, 3a blocks the bead breaking operations by the other tool 3a, 3b.

With reference now to FIGS. 5 and 6, a bead breaker group 1c is illustrated similar to the group 1b, but including here two appendages 9a, 9b articulated to the support arm 2, so as to be extended on opposite sides from each other with respect to the arm or to the longitudinal axis x-x of the arm itself and each supporting a respective bead breaker tool 3a, 3b. One or preferably both of the appendages 9a, 9b are pivoted to the arm 2.

Preferably, an actuator means 10a, 10b is also provided for on one side anchored to the arm 2 and on the other side (e.g. at the end of a stem thereof) anchored to an appendage 9a, 9b, such actuator means 10a, 10b being intended to command the angular displacement of an appendage 9a, 9b with respect to the arm 2. Still more preferably, two actuator means 10a, 10b are provided for, each articulated and designed to control the angular displacement of a respective appendage 9a, 9b with respect to the arm 2.

As will be understood, also with one such bead breaker group 1c, it is possible to move a bead breaker tool away from the work area when the other bead breaker tool is driven to complete the bead breaking of a bead of the tire.

In FIGS. 7 and 8, a bead breaker group 1d is illustrated according to the present invention that is similar to the bead breaker groups 1a, 1b and 1c, but including one or preferably two bead breaker tools 3c, 3d made according to the invention as disclosed in the European patent application No. 09158682.6 in the name of the applicant of the present patent application.

One or preferably both of the bead breaker tools 3c, 3d then comprise a flat roller element equipped with a wide circumferential edge that is sectioned or cropped, i. e. it lacks a segmental section where it delimits a nearly rectilinear abutment front, each tool 3c, 3d being rotatably mounted with respect to a respective appendage 9c, 9c, in turn fixed or articulated to the arm 2.

Preferably, a pair of actuators or jacks 11a, 11b are provided for, each supported by a framework 12 in turn anchored on one side to the arm 2 and on the other side to the tool 3c, 3d, each actuator being intended to drive in rotation a respective tool 3c, 3d, with respect to the respective appendage 9c, 9d, around the axis y-y transverse to the arm's longitudinal axis.

For the operation of one such bead breaker group, the wheel to be bead broken is locked on the rotatable wheel-carrier table of the tire mounting-demounting machine, then the arm 2 is moved so that a first bead breaker tool 3c is very close to one flank of the tire of the wheel and at the respective edge of the rim. A displacement is then commanded of the arm, along a first bead breakind direction a parallel to the z-z axis of the wheel-carrier table, so as to bring the bead breaker tool 3c in abutment with its rectilinear abutment front against the edge of the rim in abutment against the flank of the tire.

At this point, the extension of the stem of the actuator 11a is commanded, followed by the rotation of the tool 3c with respect to the appendage 9c, so that the tool penetrates between the tire and the rim, initiating the bead breaking of the first bead. Such bead breaking is completed by rotating the wheel-carrier table and thus the tired wheel loaded thereon.

After the first bead has been bead broken, the withdrawal of the stem of the actuator 11a is commanded, so that the tool 3c will complete a rotation with respect to the appendage 9c around the y-y axis that is opposite that previously completed. The tool 3c will disengage both from the rim and from the bead of the tire. At this point, the bead breaker group 1c can be moved away from the bead broken wheel, brought to the other flank of the tire and thus driven along the second bead breaking direction b to complete the bead breaking of the second bead of the tire via the second bead breaker tool 3b, as described above.

Figure 9:
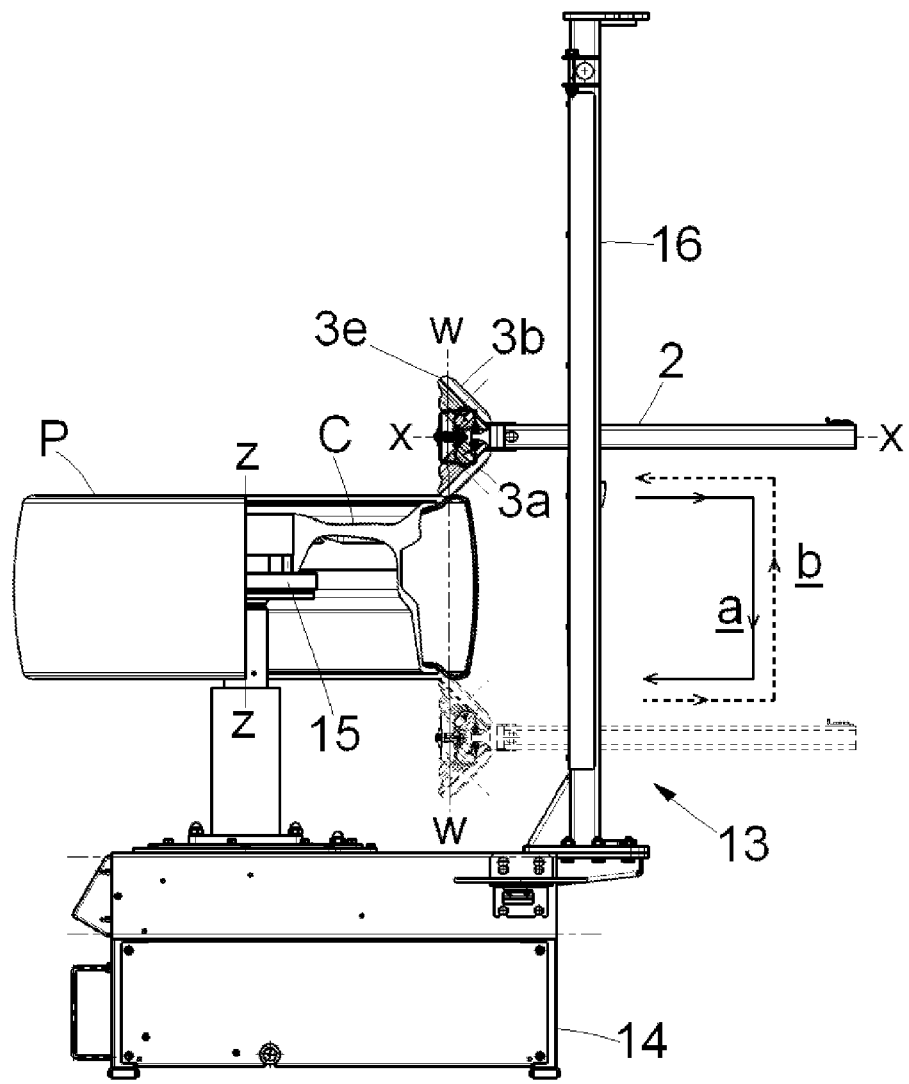
FIG. 9 is a schematic side view of a tire mounting-demounting machine according to the present invention during some bead breaking steps.

FIG. 9 illustrates a tire mounting-demounting machine 13 according to the present invention including a base 14, a wheel-carrier support 15 mounted for rotation around a rotation axis z-z, on which a rim C or a tired wheel is removably fixable, and a column 16 rising from the base 14. Such machine includes a bead breaker group 1a, 1b, 1c or 1d whose support arm 2 is overhangingly supported by the column 16 so as to be transversely extended with respect to the rotation axis z-z of the wheel-carrier table or support 15.

Advantageously, the bead-breaking directions a, b along the bead breaking axis w-w are substantially parallel with respect to the rotation axis (z-z).

More advantageously, should the rotation axis z-z extend substantially vertically or in a direction other than horizontal, one of the bead breaker tools has, in use, an upward directed work front, whereas the other has a downward work front.

As explained above, the tire mounting-demounting machine can include at least one sleeve or bush M supported by the column 16, which is designed to support the support arm 2. The machine 13 can also include an actuator 6, for example, which is set to command the extension-withdrawal of the support arm 2 with respect to the sleeve or bush M.

Due to a bead breaker group and to a machine according to the present invention, it is possible to carry out bead breaking operations of both beads of a tire through the movement of only one support arm along directions parallel to the rotation axis of the wheel-carrier table and radially thereto. Thus there is no need to rotate the arm around its longitudinal axis.

Such bead breaker group thus allows carrying out the bead breaking operations in a simple and quicker manner with respect to the conventional tire mounting-demounting machines. Moreover, it has lower obtainment costs and is easier to assembly than the bead breaker groups proposed up to now.

As it will be understood, a bead breaker group according to the application invention is quite different with respect to prior art machines which are equipped with an arm supporting a pair of bead releasing tools.

The bead breaker group according to the present invention is displaceable, in use, in two bead breaking directions a, b along one bead breaking axis w-w, and more particularly the work front of each bead breaker tools is, in use, permanently directed towards a respective bead breaking direction a, b.

Prior art machines have instead two bead breaker tools designed to co-act during the bead breaking steps, and when the bead breaking steps of both beads of a tired wheel are carried out in such prior art machines, the pair of bead breaker tools must be brought first onto one side of the tired wheel, thus with both bead breaker tools cooperating and facing a first flank of the tire and both having the work front directed towards a first bead breaking direction, and subsequently onto the other side, i. e. with both bead breaker tools facing the other flank of the tired wheel, thus both having the work front thereof directed towards the other bead breaking direction. However, such steps must be carried by causing the rotation of the support arm about its longitudinal axis.

The bead breaker group described above is susceptible to numerous modifications and variations within the protection scope defined by the claims.

What is claimed is:

1. A tire mounting-demounting machine including a base, a wheel carrier support rotatable around a rotation axis, on which a rim or a tired wheel is removably fixable, at least one column rising from said base, and a bead breaker group including a single support arm displaceable, in use, in two substantially parallel bead breaking directions along one bead breaking axis, and comprising a pair of bead breaker rollers supported on substantially opposite sides with respect to the single support aim, thereby defining opposite work fronts directed away from the single support arm, each bead breaker roller having one work front only, the work front of a first bead breaker roller of said pair of bead breaker rollers being permanently directed towards only one bead breaking direction of said two bead breaking directions, whereas the work front of a second bead breaker roller of said pair of bead breaker rollers is permanently directed towards only the other bead breaking direction of said two bead breaking directions, said single support arm supported by said column and projecting so as to extend transversely with respect to the rotation axis of said wheel-carrier support, the bead-breaking directions extending along the bead breaking axis and being substantially parallel with respect to said rotation axis.

2. The machine according to claim 1, wherein said support arm comprises a pair of appendages substantially extending on opposite sides with respect to the support arm, each designed to support a respective bead breaker roller.

3. The machine according to claim 2, wherein said pair of appendages include a single-body component anchorable to said support arm.

4. The machine according to claim 2, wherein said pair of appendages include a single-body component anchorable to said support arm, and wherein said single-body component is pivoted to said support arm in order to carry out angular displacements around an axis that is transverse with respect to said support arm, and comprising at least one actuator means anchored on one side to said support arm and on the other side to said single body component in order to command the angular displacements of said single-body component.

5. The machine according to claim 2, wherein said at least one pair of appendages is articulated to said support arm in order to carry out angular displacements around an axis that is transverse with respect to said support arm and comprising at least one actuator means anchored on one side to said support arm and on the other side to a respective appendage in order to command the angular travels of said appendage.

6. The machine according to claim 1, wherein at least one of said bead breaker rollers is mounted for rotation around an axis transverse to said support arm and comprises a flat roller element equipped with a wide circumferential edge that is sectioned or cropped, at which it delimits a substantially rectilinear abutment front.

7. The machine according to claim 6, comprising at least one actuator supported by said support arm and designed to actuate at least one flat roller element tool and to drive it in rotation around said transverse axis.

8. The machine as claimed in claim 1, wherein both said bead breaker rollers are mounted for rotation around an axis transverse to said support arm, whereas said support arm has a longitudinal axis, and wherein the transverse rotation axis of both bead breaker rollers extends in the plane delimited by said longitudinal axis and said bead breaking axis or in a plane substantially parallel thereto.

9. The machine according to claim 1, comprising at least one sleeve or bush supported by said column and designed to support said support arm, at least one actuator for commanding the extension-withdrawal of said support arm with respect to said sleeve or bush.

10. The machine as claimed in claim 1, wherein said rotation axis extends substantially vertically or in a direction other than horizontal, and one of said bead breaker rollers has, in use, an upward directed work front, whereas the other of said bead breaker rollers has a downward work front.

11. A method of bead breaking by means of a tire mounting-demounting machine, comprising the following steps:

providing a tire mounting-demounting machine including a base, a wheel-carrier support rotatable around a rotation axis, on which a rim or a tired wheel is removably fixable, and at least one column rising from said base, and comprising a bead breaker group including:

a single support arm displaceable, in use, in two substantially parallel bead breaking directions along one bead breaking axis, and comprising a pair of bead breaker rollers supported on substantially opposite sides with respect to the single support arm, thereby defining opposite work fronts directed away from the single support arm, the work front of a first bead breaker roller of said pair of bead breaker rollers being permanently directed towards one bead breaking direction of said two bead breaking directions, whereas the work front of a second bead breaker roller of said pair of bead breaker rollers is permanently directed towards the other bead breaking direction of said two bead breaking directions, said single support arm being projectingly supported by said column so as to be transversely extended with respect to the rotation axis of said wheel-carrier support, and said bead-breaking directions being along said bead breaking axis and substantially parallel to the rotation axis;

prearranging, on said wheel-carrier support, a tired wheel to be bead broken comprising a rim and a tire mounted thereon;

bringing said bead breaker group with a first bead breaker roller having a work front close to a zone of contact between a first bead of the tire and a respective edge of the rim, and directed towards said first bead, whereas said second bead breaker roller has the work front thereof directed away from said first bead;

displacing said bead breaker group in a first bead breaking direction along said axis, thereby bead breaking said first bead via said first bead breaker roller only;

moving said bead breaker group so as to bring it to the second bead of said tired wheel, with the other bead breaker roller thereof having work front close to a zone of contact between the second bead and the respective edge of said rim, and directed towards said second bead, whereas said first bead breaker roller has work front directed away from said second bead; and displacing said bead breaker group along a second bead breaking direction, thereby bead breaking said second bead by means of said second bead breaker roller only.

12. A tire mounting-demounting machine comprising:

a base;

a wheel carrier support rotatable around a rotation axis, on which a rim of a tired wheel is removably fixable;

at least one column rising from said base; and a bead breaker group including a single support arm displaceable, in use, in two substantially parallel bead breaking directions along one bead breaking axis, and comprising an upper bead breaker roller and a lower bead breaker roller supported on substantially opposite sides with respect to the single support aim, thereby defining opposite work fronts directed away from the single support arm, each of the upper and lower bead breaker rollers having one work front only, the work front of the upper bead breaker roller being directed towards only one bead breaking direction of said two bead breaking directions, whereas the work front of the lower bead breaker roller is directed towards only the other bead breaking direction of said two bead breaking directions, said single support arm supported by said column and projecting so as to extend transversely with respect to the rotation axis of said wheel-carrier support, the bead-breaking directions extending along the bead breaking axis and being substantially parallel with respect to said rotation axis.

13. The machine according to claim 12, wherein said support arm comprises a pair of appendages substantially extending on opposite sides with respect to the support arm, each designed to support a respective bead breaker roller.

14. The machine according to claim 13, wherein said pair of appendages include a single-body component anchorable to said support arm, and wherein said single-body component is pivotable with respect to said support arm in order to carry out angular displacements around an axis that is transverse with respect to said support arm, and comprising at least one actuator means anchored on one side to said support arm and on the other side to said single body component in order to command the angular displacements of said single-body component.

15. The machine according to claim 13, wherein said at least one pair of appendages is articulated to said support arm in order to carry out angular displacements around an axis that is transverse with respect to said support arm and comprising at least one actuator means anchored on one side to said support arm and on the other side to a respective appendage in order to command the angular travels of said appendage.

16. The machine according to claim 12, wherein at least one of said bead breaker rollers is mounted for rotation around an axis transverse to said single support arm and comprises a flat roller element equipped with a wide circumferential edge that is sectioned or cropped, at which it delimits a substantially rectilinear abutment front.

17. The machine according to claim 16, comprising at least one actuator supported by said single support arm and designed to actuate at least one flat roller element tool and to drive it in rotation around said transverse axis.

18. The machine as claimed in claim 12, wherein both said bead breaker rollers are mounted for rotation around an axis transverse to said single support arm, whereas said single support arm has a longitudinal axis, and wherein the transverse rotation axis of both bead breaker rollers extends in the plane delimited by said longitudinal axis and said bead breaking axis or in a plane substantially parallel thereto.

\* \* \* \* \*